(No Model.)
G. SMITH.
Duplex Telegraph.
No. 238,448. Patented March 1, 1881.
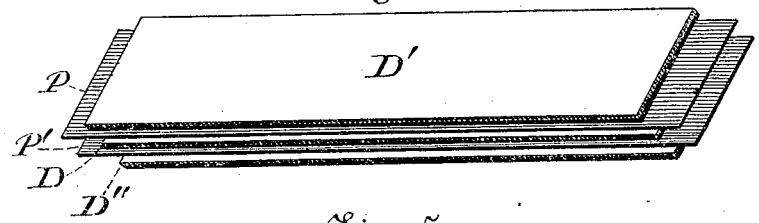
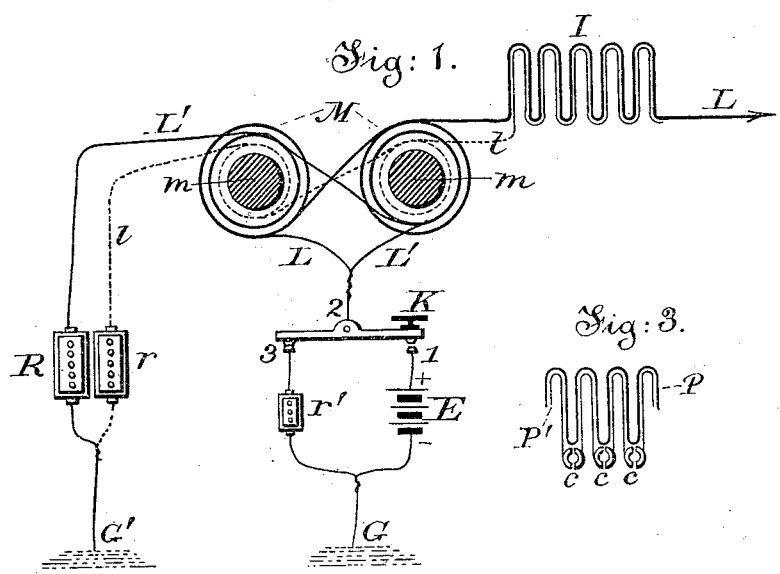
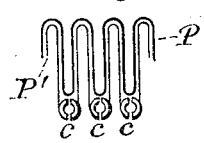
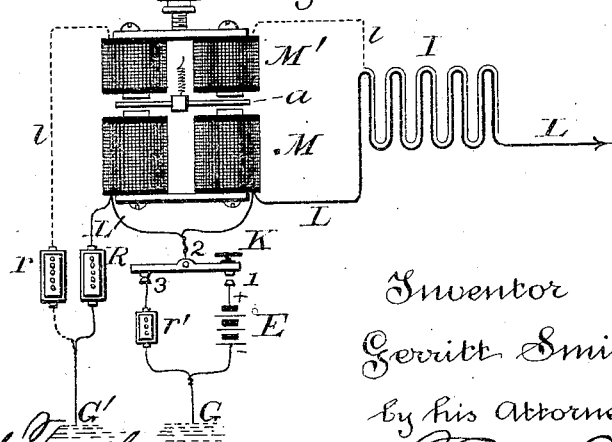
Witnesses:
Miller C. Earl
Mrs. J. Lockwood French
Inventor
Gerritt Smith,
by his Attorney,
Frank L. Pope

UNITED STATES PATENT OFFICE.

GERRITT SMITH, OF ASTORIA, NEW YORK.

DUPLEX TELEGRAPH.

SPECIFICATION forming part of Letters Patent No. 238,448, dated March 1, 1881.

Application filed December 14, 1880. (No model.)

*To all whom it may concern:*

Be it known that I, GERRITT SMITH, a citizen of the United States, residing at Astoria, in the county of Queens and State of New York, have invented certain new and useful Improvements in Duplex Telegraphs, of which the following is a specification.

My invention relates to certain improvements in the apparatus which has heretofore been employed for the transmission of two independent sets of telegraphic signals simultaneously from opposite ends of one and the same line-wire.

The general object of my invention is to neutralize or prevent the production of the false signal which would otherwise be manifested upon the receiving-instrument situated at the transmitting, or, as it is technically termed, the "home," station by the so-called "static discharge," which consists in the sudden escape to earth of a quantity of electricity stored up or accumulated upon the main line by induction during the outward flow of the electric current which constitutes a telegraphic signal.

My invention comprises the following subdivisions: first, the combination of a main line, a differential receiving-instrument, and two independent artificial lines, each permanently connected with the earth through the said receiving-instrument, one of which lines serves to compensate the dynamic and the other the static effects of the current transmitted from the home station, whereby the home receiving-instrument remains unaffected either by the dynamic or static action due to the transmission of signals from that station; second, in the combination of a battery, a main line, an artificial line, a differential receiving-instrument, and two inductive surfaces separated from each other by a dielectric, one of said surfaces being included in or connected with the main line and the other permanently with the earth through the receiving-instrument, whereby the inductive discharge from the main and artificial lines are caused to neutralize the effect of each other upon the home receiving-instrument; third, in the combination of a transmitting-key, a battery placed between said key and the earth, a main line extending from said key to the earth at the distant station, an artificial line extending from said key to the earth at the home station, and an auxiliary artificial line, one end of which is permanently connected to the earth at the home station, while the other end terminates in an inductive surface capable of receiving a charge from the main line, whereby the said artificial line is inductively charged from the main line and its charge, when set free, is conducted to the earth at the home station; fourth, in the combination of the apparatus set forth in the third subdivision hereof with an adjustable resistance interposed in the auxiliary artificial line at a point between the inductive surface and the earth, whereby the duration of the flow of the inductive discharge to the earth may be regulated or controlled; fifth, in the combination of a main telegraph-line, an artificial line permanently connected with the earth and capable of receiving a charge by induction directly from said main line, and a differential electro-magnet having one of its coils included in said artificial line, whereby the simultaneous discharges of the main and artificial lines are caused to neutralize each other's effect upon the armature of said electro-magnet; sixth, in the combination of an electro-magnetic core, an armature, and three independent coils capable of acting simultaneously thereon, which are included, respectively, in the circuit of a main line, an artificial line for compensating the dynamic effects of the main-line currents, and an auxiliary artificial line for compensating the static effects of the main-line currents, whereby both the static and dynamic effects of the main-line current in one coil of the electro-magnet are compensated by the simultaneous action of the static and dynamic electric influence in the outer two coils; seventh, in the combination of a battery, a main line, an artificial line, two inductive surfaces separated from each other by a dielectric, one of said surfaces being included in or connected with a main line and the other with the earth, and suitable devices for disconnecting or rendering inactive any required portion of one of said inductive surfaces, whereby the quantity of electricity induced in the said artificial line by a given main-line current may be regulated and controlled.

To the end that the nature of my invention may be more readily understood, I will first describe the construction and mode of operation of one of the ordinary and well-known systems of telegraphy for the simultaneous transmission of signals in opposite directions over the same line-wire, which are technically termed "duplex telegraphs," and will then explain the application of my improvements thereto.

In the accompanying drawings, Figure 1 is a diagram representing my improvements in connection with one of the ordinary forms of duplex telegraphs. Fig. 2 shows its application to the same in a modified form. Figs. 3, 4, and 5 are detached views, illustrating certain details of the construction of my apparatus.

In the transmission of simultaneous signals in opposite directions upon the same line, there exist two essential conditions which must be complied with: First, the receiving-instrument at each station must remain at all times in connection with the line, and, second, the currents transmitted by the key at the home station must not produce a signal upon the receiving-instrument at the same station. The manner in which these conditions are fulfilled in my improved apparatus will be hereinafter explained.

In the drawings, Fig. 1 represents, in the form of a diagram, the apparatus at one terminal station of a duplex line; the other or distant station is precisely the same in its construction and operation. M represents the electro-magnet of a receiving-instrument, having the usual soft-iron cores, $m\,m$, which, in the present instance, are supposed to be connected together by a yoke, and to act upon a movable armature of soft iron in a manner well understood. K is a transmitting-key of the ordinary and well-known construction. The front contact, 1, of this key is connected to one pole (in this instance, the positive pole) of a main battery, E, the other pole thereof being connected to the ground at G. The rear contact, 3, of the key K is connected directly to the ground at G, preferably including in the latter circuit a resistance, $r'$, which should be approximately equal to the average internal resistance of the battery E. From the lever of the key K two lines diverge, the first or main line L passing first around the left-hand and then around the right-hand core of the electro-magnet M, thence through the inductor I, and thence to the ground at the distant station. The other branch, L', passes in the opposite direction, first around the right-hand and then around the left-hand core of the magnet M, and thence through the rheostat or adjustable resistance R to the ground at G' at the home station. It will be understood, therefore, that when the key K is depressed or brought into contact with the stop 1, the current from the battery E passes through the key to the point 2, where it divides, one portion passing through the coils of the electro-magnet M, and thence through the inductor I and the line to the distant station, while the other portion passes through another coil of the electro-magnet M in the opposite direction, and returns directly to the earth through the artificial line L' and the rheostat R. This latter branch of the circuit is technically termed the "artificial line," in order to distinguish it from the main line, which extends to the distant station. By adjusting the resistance at R so that it is approximately the same as that of the main line, the current from the key will divide at the point 2 into two equal portions, which will produce equal and opposite electro-dynamic effects upon the armature of the electro-magnet M, and the armature will therefore remain at rest notwithstanding that a current is passing over the line L to the distant station. If, however, the distant station transmits a current at the same time, the strength of the current in the main line is augmented by the combined action of both terminal batteries, and its dynamic effect overpowers that of the current in the artificial line L'. Consequently the armature of electro-magnet M is attracted and a signal is produced at the home station. Thus it will be understood that the receiving-instrument at the home station responds only to currents or signals coming from the distant station, and not to those transmitted by the key at the home station, and consequently the two stations can transmit signals simultaneously to each other without interference. The receiving-instrument at each station, although at all times traversed by the current of the main line, responds only to the signals produced by the transmitting-key at the other station.

Having thus explained the construction and mode of operation of an ordinary duplex-telegraph apparatus, I will next describe the nature of my improvement and the mode of its application thereto in the best manner now known to me.

It is well known that an insulated telegraphic line-wire of considerable length, whether suspended above the earth or submerged beneath the water, is capable of accumulating or storing up a quantity of electricity while connected with a source of electricity, such as a battery. This property of an insulated conductor is termed its "inductive" or "electro-static" capacity, and the electricity so stored up and retained is called the "static" charge of the conductor. The electro-static capacity of the insulated conductor is a quantity depending upon the extent of its superficial area, and upon the thickness of the non-conducting space which separates it from the earth, or from other conductors in electric connection with the earth, which insulating-space is called the "dielectric." Thus, in the case of an ordinary telegraph-line suspended upon poles in the air, the earth and the surrounding objects connected therewith—such as buildings, trees, and the like—form the outer inductive surface, while the air constitutes the insulating medium or dielectric surrounding the conductor. In the case of a submarine cable the insulating coating of gutta-percha constitutes the dielectric, and the iron armor of the cable or the surrounding water, as the case may be, the outer inductive surface. The thickness of the dielectric being necessarily very much less in a submarine cable than in an air line, the inductive surfaces are brought nearer together. Hence the electro-static capacity of a submarine line is many times greater than that of an air line of equal length. It will appear, therefore, from the hereinbefore-mentioned considerations, that when a long line of telegraph is connected with the battery by depressing the key at the sending-station—as for the purpose of transmitting a signal—the line will acquire a considerable static charge. At the completion of the signal, when the key is raised, the line is first disconnected from the battery and immediately afterward connected directly to the earth at the home station, whereupon the accumulated induced electricity stored up in the line will suddenly escape to the earth, traversing one wire of the electro-magnet M of the home receiving-instrument, and producing what is termed the "static discharge." As the rheostat R and the short artificial line in which it is placed have practically no electro-static capacity, there will be no corresponding discharge from the artificial line L' through the opposing wire of the electro-magnet M, and consequently an extra or false signal of short duration will be produced by the uncompensated action of the static discharge of the main line in the electro-magnet. I have discovered that this effect of the static discharge from the line upon the home instrument may be compensated or neutralized by making use of an inductor in connection with the main line, the receiving-instrument, and the earth, in a manner which I will now proceed to describe.

Referring to Figs. 4 and 5, P and P' are two broad thin strips of metal, which are conductors of electricity. Between them is placed a dielectric, D, of similar form, composed of some insulating material—such, for example, as linen paper saturated with paraffine.

Such an apparatus is analogous in its construction to a Leyden jar, in which P represents the inner metallic coating, D the non-conducting material of the jar, and P' the outer metallic coating, which is connected with the earth. It is well known that if the metallic coating corresponding to the plate P be charged with positive electricity from any source, it will induce an equal charge of negative electricity in the coating corresponding to the plate P', connected with the earth, and that when the jar is thus charged, if the plate P be disconnected from the source of electricity and connected directly to the earth, a double discharge takes place, the positive electricity from P and the negative electricity from P' flowing simultaneously to earth and there neutralizing each other. I avail myself of this principle for the purpose of neutralizing the static discharge from the line which produces the false signal in the receiving-instrument of a duplex telegraph. To this end I place between the home relay and the line-wire leading to the distant station an inductor, I, which consists, essentially, of two strips of tin-foil or other suitable metal. P P', separated by a strip of dielectric, D, of the same breadth, and preferably inclosed by two additional strips of insulating material, D' and D'', arranged as shown in Figs. 4 and 5. This apparatus may be constructed of any required length, and is preferably folded up, so as to occupy as little space as possible, thus constituting the inductor I of Figs. 1, 2, and 3. One of the metallic strips, P, is included in the circuit of the line-wire L; the other strip, P', is connected to the earth at the home station by means of a wire, l, which may be termed the "auxiliary artificial line." This wire passes, by an independent helix, around both cores of the electro-magnet M in the same direction as the main line L. When a signal is transmitted over the line L from the positive pole of the battery E, an electro-static charge is stored up in the plate P' of the inductor I, which is equal in quantity but opposite in polarity to that of the corresponding portion of the main line. When the key K is raised and the main line is connected with the earth at the point 3, the charge of the main line escapes to earth through the wire L, and at the same time the opposite charge in the inductor I is also set free and escapes to earth by the wire l. As these two wires both pass in the same direction around the coils of the magnet M, and as the polarities of the two discharges are unlike, they compensate each other's effect upon the cores of the receiving-instrument, and no false signal is produced.

It is evident that as the inductive surface connected with the auxiliary artificial line l does not extend the whole length of the main line L, the electro-static capacity of the latter, and consequently the quantity of electricity discharged, will be greater than that of the artificial line. This inequality may be compensated by a proper adjustment of the relative resistance of the rheostats r r'. I prefer, however, in many cases to make use of the modification of the apparatus which is shown in Fig. 2. In this case the auxiliary artificial line l is arranged in the same manner as hereinbefore described, with the exception that it passes through an independent electro-magnet, M', which is arranged, as shown in the figure, so as to exert an attraction in the opposite direction upon the armature a of the electro-magnet M. In this case the comparative weakness of the artificial discharge may be readily compensated by adjusting the screw m' so that the auxiliary electro-magnet M' may be nearer to the armature a than the main magnet M. The rheostat r is employed in this instance principally for the purpose of regulating the duration of the discharge.

I have shown in Fig. 3 a device for regulating the quantity of electricity which the inductor is capable of storing up. I effect this by dividing the plate P' into any required number of detached sections, which are connected together by means of peg-commutators $c\ c$, of the usual construction. By withdrawing one or another of these pegs any required portion of the plate P' may be disconnected from the earth, in which case it ceases to be active, and its electro-static capacity is reduced to zero.

By the method and apparatus hereinbefore described I am enabled to utilize the inductive charge stored up in the outer conductor, which has hitherto been wasted, and to utilize the same advantageously in neutralizing the effects of the discharge from the line upon the home receiving-instrument.

I do not limit myself to the use of the inductor constructed substantially in the manner described solely in connection with the peculiar forms of the duplex telegraphs hereinbefore referred to, as it may be employed with equally good results in combination with other well-known forms of apparatus. The modifications necessary to adapt it to such use will readily suggest themselves to those skilled in the art.

I claim as my invention—

1. The combination, substantially as hereinbefore set forth, of a main line, a differential receiving-instrument, and two independent artificial or compensating lines, each permanently connected with the earth through the said receiving-instrument, one of which lines acts to compensate the dynamic and the other the static effects of the current transmitted from the home station.

2. The combination, substantially as hereinbefore set forth, of a battery, a main line, an artificial or compensating line, a differential receiving-instrument, and two inductive surfaces separated from each other by a dielectric, one of said surfaces being included in or connected with the main line, and the other permanently with the earth through the receiving-instrument.

3. The combination, substantially as hereinbefore set forth, of a transmitting-key, a battery placed between said key and the earth, a main line extending from said key to the earth at the distant station, an artificial line extending from said key to the earth at the home station, and an auxiliary artificial line, one end of which is permanently connected to the earth at the home station, while the other end terminates in an inductive surface capable of receiving a charge from the main line.

4. The combination, substantially as hereinbefore set forth, of a transmitting-key, a battery between said key and the earth, a main line extending from said key to the earth at the distant station, an artificial line extending from said key to the earth at the home station, an auxiliary artificial line, one end of which is permanently connected to the earth at the home station, while the other end terminates in an inductive surface capable of receiving a charge from the main line, and an adjustable resistance interposed in the last-named artificial line at a point between said inductive surface and the earth.

5. The combination, substantially as hereinbefore set forth, of a main telegraph-line, an artificial line permanently connected with the earth and capable of receiving a charge inductively from said main line, and a differential electro-magnet having one of its coils included in said artificial line.

6. The combination, substantially as hereinbefore set forth, of an electro-magnet, core, and armature, three independent coils or helices capable of acting simultaneously thereon, which are included respectively in the circuit of a main line, an artificial line for compensating the dynamic effects of the main-line currents, and an auxiliary artificial line for compensating the static effects of the main-line currents.

7. The combination, substantially as hereinbefore set forth, of a battery, a main line, an artificial or compensating line, two inductive surfaces separated from each other by a dielectric, one of said surfaces being included in or connected to the main line and the other to the earth, and means for disconnecting or rendering inoperative any required portion of one of said inductive surfaces.

In testimony whereof I have hereunto subscribed my name this 13th day of December, A. D. 1880.

GERRITT SMITH.

Witnesses:
NELSON ZABRISKIE,
MILLER C. EARL.